(12) United States Patent
Orlowski et al.

(10) Patent No.: US 11,978,992 B2
(45) Date of Patent: May 7, 2024

(54) CRIMP MACHINE HAVING TERMINAL PRE-CHECK

(71) Applicant: TE Connectivity Services GmbH, Schaffhausen (CH)

(72) Inventors: Matthew Orlowski, Harrisburg, PA (US); Peter John Borisuk, Abington, PA (US)

(73) Assignee: TE Connectivity Solutions Gmbh (CH)

( * ) Notice: Subject to any disclaimer, the term of this patent is extended or adjusted under 35 U.S.C. 154(b) by 536 days.

(21) Appl. No.: 17/188,353

(22) Filed: Mar. 1, 2021

(65) Prior Publication Data

US 2022/0278492 A1 Sep. 1, 2022

(51) Int. Cl.
| | |
|---|---|
| *H01R 43/048* | (2006.01) |
| *G05B 19/19* | (2006.01) |
| *G06F 3/04847* | (2022.01) |
| *G06K 7/14* | (2006.01) |
| *G06T 7/00* | (2017.01) |

(Continued)

(52) U.S. Cl.
CPC .......... *H01R 43/048* (2013.01); *G05B 19/19* (2013.01); *G06F 3/04847* (2013.01); *G06K 7/1413* (2013.01); *G06T 7/0004* (2013.01); *G06T 7/62* (2017.01); *G06T 7/70* (2017.01); *G06T 7/90* (2017.01); *G06T 11/00* (2013.01); *H01R 43/058* (2013.01); *G05B 2219/33002* (2013.01); *G06K 2007/10504* (2013.01); *G06Q 30/0185* (2013.01); *G06Q 50/04* (2013.01); *G06T 2200/24* (2013.01); *G06T 2207/20081* (2013.01)

(58) Field of Classification Search
CPC .... H01R 43/048; H01R 43/058; G05B 19/19; G05B 2219/33002; G06F 3/04847; G06K 7/1413; G06K 2007/10504; G06T 7/0004; G06T 7/62; G06T 7/70; G06T 7/90; G06T 11/00; G06T 2200/24; G06T 2207/20081; G06Q 30/0185; G06Q 50/04
USPC ........................................................ 700/206
See application file for complete search history.

(56) References Cited

U.S. PATENT DOCUMENTS

| | | |
|---|---|---|
| 4,555,799 A | 11/1985 | Kodama et al. |
| 6,738,134 B2 | 5/2004 | Maeda |

(Continued)

FOREIGN PATENT DOCUMENTS

| | | |
|---|---|---|
| JP | 2006227025 A | 8/2006 |
| JP | 3873445 B2 | 1/2007 |

(Continued)

*Primary Examiner* — Michael J Brown

(57) ABSTRACT

A crimp machine is provided and includes an anvil having a lower die having a lower forming surface. The anvil is configured to support a crimp barrel of a terminal that receives a wire. The crimp machine includes a press having an upper die having an upper forming surface. The press is movable relative to the anvil during a crimping process to connect the crimp barrel to the wire. A crimp zone is defined between the upper forming surface and the lower forming surface. The crimp machine includes a vision system positioned to view the crimp zone. The vision system includes an imaging device configured to image the crimp barrel of the terminal and the wire. The vision system operates the imaging device to capture an image prior to the crimping process for performing a validation pre-check prior to the crimping process.

26 Claims, 5 Drawing Sheets

(51) Int. Cl.
*G06T 7/62* (2017.01)
*G06T 7/70* (2017.01)
*G06T 7/90* (2017.01)
*G06T 11/00* (2006.01)
*H01R 43/058* (2006.01)
G06K 7/10 (2006.01)
G06Q 30/018 (2023.01)
G06Q 50/04 (2012.01)

(56) References Cited

U.S. PATENT DOCUMENTS

| | | |
|---|---|---|
| 7,409,080 B2 | 8/2008 | Maeda et al. |
| 9,548,580 B2 | 1/2017 | Hallman et al. |
| 2015/0340827 A1* | 11/2015 | Hallman ............... H01R 43/048 29/863 |
| 2019/0006809 A1 | 1/2019 | Takada |
| 2019/0097374 A1 | 3/2019 | Takada |
| 2019/0176201 A1* | 6/2019 | Angerer ................... B21D 5/02 |

FOREIGN PATENT DOCUMENTS

| | | |
|---|---|---|
| JP | 2011107024 A | 6/2011 |
| JP | 5567061 B2 | 8/2014 |
| JP | 2017026449 A | 2/2017 |

* cited by examiner

CRIMP MACHINE HAVING TERMINAL PRE-CHECK

BACKGROUND OF THE INVENTION

The subject matter herein relates generally to crimp machines.

Electrical terminals may be crimped onto wires by a crimp machine, such as a bench machine or a lead making machine, to form a lead or wire harness. In a typical crimping operation, a terminal is placed in a crimping zone of the crimp machine and a wire is inserted into a ferrule or barrel of the terminal. Then, a ram of the crimping machine moves toward the wire and terminal along a crimp stroke. The ram pinches or crimps the terminal around the wire, which mechanically and electrically connects the wire to the terminal and forms the lead.

The position and orientation of the wire relative to the terminal in the crimping zone as well as the position of the terminal relative to the tooling in the crimping zone are critical to the overall production performance and efficiency of the crimping machine. For example, production leads have to meet very strict crimp specifications. A wire that is not properly located in either the side-to-side or front-to-back directions relative to the terminal may not meet the crimp specifications. Additionally, a misplaced terminal in the tooling may not meet the crimp specifications. Some known crimp machines use various post-termination checks to ensure crimp quality. For example, some known crimp machines use crimp force analysis and/or positional analysis for crimp quality tests. Other systems use pull tests or cross-sectioning of completed terminations for crimp quality analysis. Some of the known crimp quality tests are destructive for the termination, which wastes time and materials. Additionally, the crimp quality tests are performed after the crimp is completed. Terminations that do not meet crimp specifications are discarded, which wastes time and materials. Post termination checks are particularly problematic for applications that use high-cost cable assemblies or wiring harnesses, such as those used in the auto industry, having multiple terminations where the entire wire harness may be wasted if any of the terminations do not meet crimp specifications.

BRIEF DESCRIPTION OF THE INVENTION

In one embodiment, a crimp machine is provided. The crimp machine includes an anvil having a lower die having a lower forming surface. The anvil is configured to support a crimp barrel of a terminal that receives a wire. The crimp machine includes a press having an upper die having an upper forming surface. The press is movable relative to the anvil during a crimping process to connect the crimp barrel to the wire. A crimp zone is defined between the upper forming surface and the lower forming surface. The crimp machine includes a vision system positioned to view the crimp zone. The vision system includes one or more imaging devices configured to image the crimp barrel of the terminal and the wire. The vision system operates the imaging device to capture an image prior to the crimping process for performing a validation pre-check prior to the crimping process.

In another embodiment, a crimp machine is provided. The crimp machine includes an anvil having a lower die having a lower forming surface. The anvil includes a lower die graphic identifier that is computer-readable and disposed on the lower die. The anvil is configured to support a crimp barrel of a terminal that receives a wire. The crimp machine includes a press having an upper die having an upper forming surface. The press includes an upper die graphic identifier that is computer-readable and disposed on the upper die. The press is movable relative to the anvil during a crimping process to connect the crimp barrel to the wire. A crimp zone is defined between the upper forming surface and the lower forming surface. The crimp machine includes a vision system positioned to view the crimp zone. The vision system includes imaging device(s) configured to image at least one of the lower die graphic identifier or the upper die graphic identifier. The vision system operates the imaging device to capture an image prior to the crimping process. The vision system reads the at least one of the lower die graphic identifier or the upper die graphic identifier in the image for performing a validation pre-check prior to the crimping process.

In a further embodiment, a method of performing a validation pre-check prior to a crimping process is provided. The method positions an anvil having a lower die having a lower forming surface at a crimp zone. The anvil is configured to support a crimp barrel of a terminal that receives a wire. The method positions a press having an upper die having an upper forming surface at the crimp zone. The press is movable relative to the anvil during the crimping process to connect the crimp barrel to the wire. The method positions a imaging device of a vision system proximate to the crimp zone to image the crimp barrel of the terminal and the wire to capture an image for performing the validation pre-check prior to the crimping process.

DETAILED DESCRIPTION OF THE INVENTION

Figure 1:
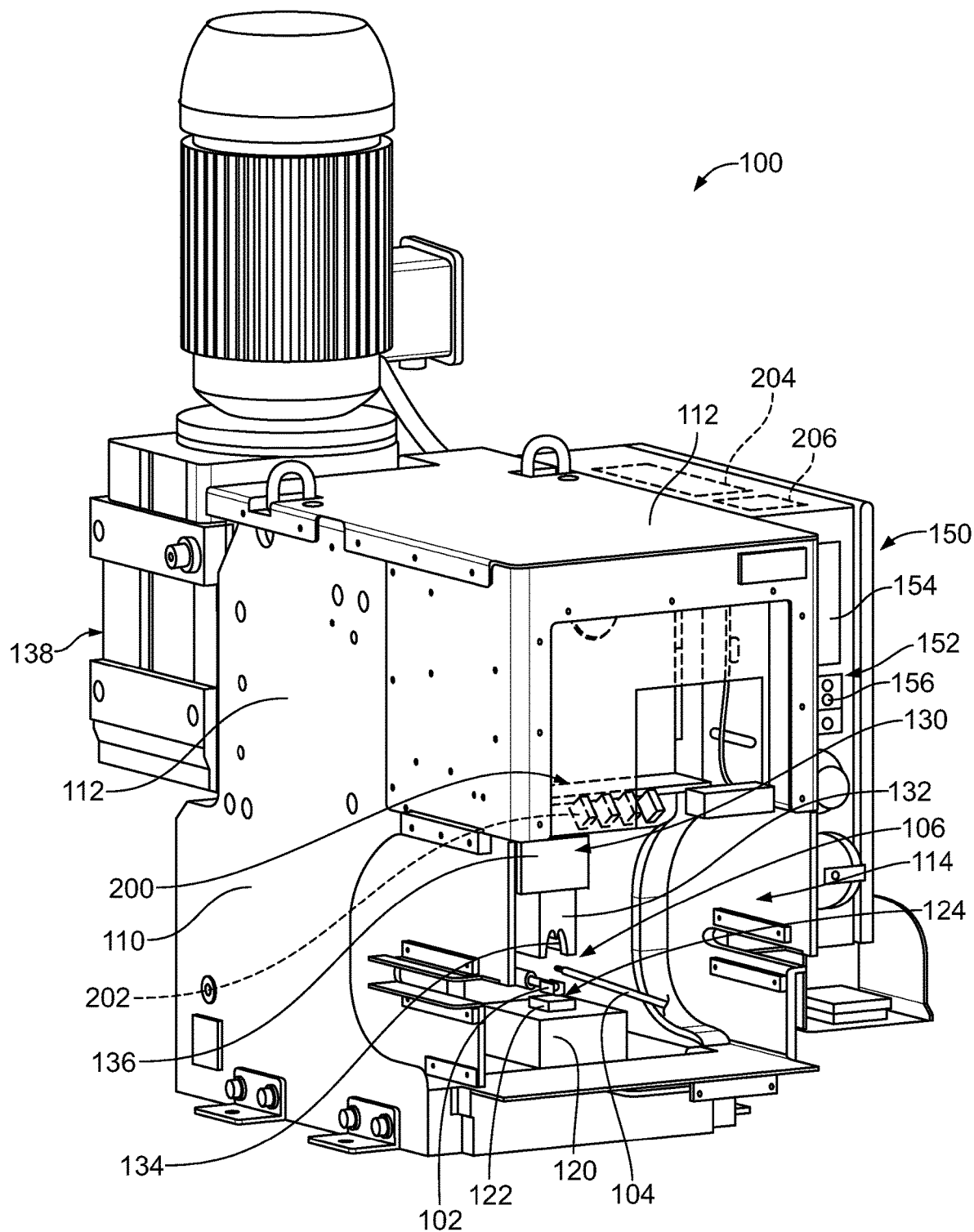
FIG. 1 illustrates a crimp machine in accordance with an exemplary embodiment.

FIG. 1 illustrates a crimp machine 100 in accordance with an exemplary embodiment. The crimp machine 100 is used for crimping a terminal 102 to an end of a wire 104 in a crimp zone 106 of the crimp machine 100. The wire 104 may be part of a wire harness, which includes a plurality of the wires 104. In various embodiments, the terminal 102 may be a high voltage power terminal, such as a blade terminal or a socket terminal. Other types of terminals may be provided in alternative embodiments. In various embodiments, the terminal 102 in the wire 104 may be used in an automotive application, such as part of a battery system of an electric vehicle.

In an exemplary embodiment, the crimp machine 100 includes a vision system 200 including one or more imaging devices 202 configured to image the terminal 102 and/or the wire 104 and/or other components of the crimp machine 100. The imaging device 202 may be a camera, scanner, optical reader or other type of imaging device. The vision system 200 is used for crimp quality monitoring, such as to determine defects such as damage to the terminal or wire, incorrect positioning of the terminal or wire, verification of the proper terminal, wire and crimping dies, and the like. In an exemplary embodiment, the vision system 200 performs a validation pre-check prior to the crimping process. For example, the vision system 200 operates the camera(s) 202 to capture an image prior to the crimping process for performing the validation pre-check. The validation pre-check process checks and validates certain termination criteria prior to performing the crimping process. As such, crimp quality is enhanced reducing scrap and waste and improving product throughput.

The crimp machine 100 includes a cabinet 110 holding various components of the crimp machine 100. The cabinet 110 is defined by one or more walls 112 that surround a cavity 114. The crimp machine 100 includes termination components received within the cavity 114. For example, the termination components include an anvil 120 and a press 130 movable relative to the anvil 120. The crimp zone 106 is defined between the anvil 120 and the press 130. The terminal 102 is crimped to the end of the wire 104 between the anvil 120 and the press 130. In an exemplary embodiment, the anvil 120 is fixed or stationary. Alternatively, the anvil 120 may be movable within the cabinet 110 during the crimping process.

The anvil 120 includes a lower die 122 having a lower forming surface 124. The lower forming surface 124 has a forming profile used to shape the terminal 102 during the crimping process. In various embodiments, the lower forming surface 124 may be planar. In other various embodiments, the lower forming surface 124 may be nonplanar, such as including a curved or angular profile. The anvil 120 is located at the bottom of the crimp zone 106 and is used to support the crimp barrel of the terminal 102 and/or the wire 104 during the crimping process. For example, the bottom of the terminal 102 may be supported on the lower forming surface 124. In an exemplary embodiment, the lower die 122 is removable and replaceable. For example, a set of lower dies 122 may be provided having different sized and/or shape lower forming surfaces 124 for forming different terminals 102. For example, different lower dies 122 may be used to crimp different sized terminals 102 or to form different types of crimps for the terminals 102.

The press 130 includes an upper die 132 having an upper forming surface 134. The upper forming surface 134 has a forming profile used to shape the terminal 102 during the crimping process. In various embodiments, the upper forming surface 134 may have an M-shape. For example, the upper forming surface 134 may have a centrally located wedge for forming the crimp barrel of the terminal 102. In various embodiments, the upper forming surface 134 may be used for forming an F-crimp. The press 130 is located at the top of the crimp zone 106. The press 130 is driven toward the anvil 120 during the crimping process to crimp the terminal 102 on to the wire 104. In an exemplary embodiment, the press 130 includes a ram 136 that is driven up and down by an actuator 138. In various embodiments, the actuator 138 may be an electric motor used to drive the ram 136 during the crimping process. Other types of actuators may be used in alternative embodiments, such as a hydraulic actuator or a pneumatic actuator. In an exemplary embodiment, the upper die 132 is removable and replaceable. For example, a set of upper dies 132 may be provided having different sized and/or shape upper forming surfaces 134 for forming different terminals 102. For example, different upper dies 132 may be used to crimp different sized terminals 102 or to form different types of crimps for the terminals 102.

In an exemplary embodiment, the crimp machine 100 includes a controller 150 operably coupled to the press 130. The controller 150 may include a computer and/or a processor for controlling operation of the crimp machine 100. In an exemplary embodiment, the crimp machine 100 includes a user interface 152 associated with the controller 150. The user interface 152 includes a display 154 and one or more user inputs 156. The user inputs 156 may include buttons, dials, knobs, a keyboard, a keypad, a mouse or pointer device, or other types of user inputs. In an exemplary embodiment, the display 154 is configured to show one or more images from the vision system 200. For example, the display 154 may show an image of the crimp zone 106. The display 154 may show the terminal 102 and/or the wire 104. The display 154 may show the lower die 122 and/or the upper die 132.

The controller 150 controls operation of the press 130 during the crimping process. The controller 150 causes the press 130 to move during the crimping process. For example, the controller 150 may be operably coupled to the actuator 138 to turn the actuator 138 on and off during the crimping process. The controller 150 is communicatively coupled to the vision system 200. The controller 150 and components of the vision system 200 may be housed together within the cabinet 110. The controller 150 receives inputs from the vision system 200 to control the crimping process. For example, the controller 150 may receive a first signal when the system passes the validation pre-check and may receive a second signal when the system fails the validation pre-check. The controller 150 may allow the crimping process to proceed once the system passes the validation pre-check. The controller 150 may restrict or not allow the crimping process to proceed once the system fails the validation pre-check. As such, the crimp machine 100 outputs high-quality crimps by restricting the crimping process unless the system passes certain validation criteria.

In an exemplary embodiment, the vision system 200 includes an image analysis module 204 that performs image analysis for the validation pre-check. The image analysis module 204 may include one or more processors and one or more memories for performing image analysis. The processors and/or the memories may be provided on one or more circuit boards. The controller 150 may be coupled to the circuit boards for communicating with the image analysis module 204. The image analysis module 204 compares the image from the camera(s) 202 with validation criteria to pass or fail the validation pre-check. In an exemplary embodiment, the image analysis module 204 processes the images using a shape recognition tool to determine validation results for the terminal 102 and/or the wire 104 and/or the crimping dies 122, 132. In various embodiments, the images are processed by performing feature extraction of boundaries and surfaces detected in the images and comparing the boundaries and surfaces to the image analysis model 204. The image analysis module 204 may compare locations of the extracted boundaries and surfaces with acceptable limits or ranges defined within the image analysis module 204. The images may be taken prior to termination and/or after termination. For example, checks can be performed after the termination and deviation from the established pre-checks can by the vision system 100 for inferring if the termination is proper.

In an exemplary embodiment, the vision system 200 includes an artificial intelligence (AI) learning module 206. The AI learning module 206 uses artificial intelligence to train the image analysis module 204 and improve inspection accuracy of the image analysis module 204. For example, the vision system 200 may use the camera 202 to take a number of images of the crimp area, such as images without a terminal, images with a terminal, and images with a terminal and wire. The images are used for training the AI learning module 206, such as comparison of various situations and configurations of the terminal and wire within the crimp zone. Some of the images may correspond to good crimps and some of the images may correspond to bad crimps to assist in the training of the AI learning module 206. The AI learning module 206 uses artificial intelligence to infer crimp quality based on the images. The AI learning module 206 customizes and configures the image analysis module 204 based on the images received from the cameras 202. The image analysis module 204 may be updated and trained in real time during operation of the crimp machine 100 in addition to being pre-trained during a calibration process. The AI learning module 206 may be operable in a learning mode to train the image analysis module 204 and further develop the image analysis model. The image analysis model 204 changes over time based on input from the AI learning module 206 (for example, based on images of the terminals 102 and the wires 104 taken by the cameras 202). The AI learning module 206 includes models and executable code which may be pre-trained by a separate entity or trained onsite by a user.

Figure 2:
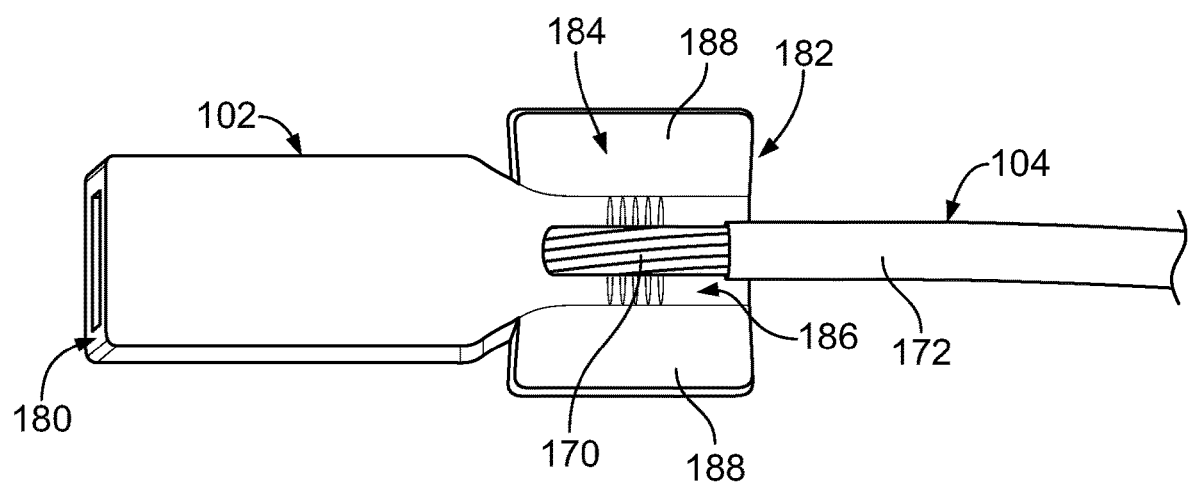
FIG. 2 illustrates a portion of a lead or wire harness in accordance with an exemplary embodiment.

FIG. 2 illustrates a portion of a lead or wire harness in accordance with an exemplary embodiment. FIG. 2 shows the terminal 102 and the wire 104 in accordance with an exemplary embodiment prior to termination. The wire 104 includes a conductor 170 and an insulator 172 surrounding the conductor 170.

In various embodiments, the wire 104 may be a shielded wire having an outer shield (not shown) coaxial with the conductor 170 with the insulator 172 between the outer shield and the conductor 170. An outer jacket (not shown) surrounds the outer shield. In other embodiments, such as in the illustrated embodiment, the insulator 172 forms the outer jacket. In an exemplary embodiment, different wires 104 may have different colored insulators 172, which may correspond to a wire gauge of the wire 104. In an exemplary embodiment, the insulator color may be determined by the vision system 200 for pre-check validation. In other various embodiments, a diameter of the insulator 172 may be determined by the vision system 200 for pre-check validation.

The conductor 170 may be a stranded conductor. Alternatively, the conductor 170 may be a solid core conductor. The conductor 170 has a diameter corresponding to a wire gauge of the wire 104. In an exemplary embodiment, the diameter of the conductor 170 may be determined by the vision system 200 for pre-check validation.

The wire 104 is prepared by removing a portion of the insulator 172 at the end of the wire 104 to expose the conductor 170. The length of the conductor 170 that is exposed is referred to as a strip length. For example, the strip length is equal to the length of the insulator 172 that is removed. In an exemplary embodiment, the strip length may be determined by the vision system 200 for pre-check validation. The exposed portion of the conductor 170 is positioned in the terminal 102 for mechanical and electrical connection between the terminal 102 and the wire 104. In an exemplary embodiment, the position of the conductor 170 relative to the terminal 102 may be determined by the vision system 200 for pre-check validation. For example, the vision system 200 may determine the length of the conductor 170 received in the crimp barrel portion of the terminal 102 and/or an amount of the conductor 170 that protrudes beyond the crimp barrel portion of the terminal 102. The vision system 200 may determine the length, if any, of the insulator 172 received in the crimp barrel portion of the terminal 102.

The terminal 102 is manufactured from a metal material and is electrically conductive. The terminal 102 is configured to be mechanically and electrically coupled to the wire 104 during the crimping process. In an exemplary embodiment, the terminal 102 extends between a mating end 180 and a terminating end 182. The terminating end 182 is configured to be crimped to the end of the wire 104. For example, the terminating end 182 may be crimped to the insulator 172 and/or the conductor 170. The terminating end 182 includes a crimp barrel 184 configured to receive the wire 104. The crimp barrel 184 includes a cup 186 flanked by crimp tabs 188. The crimp tabs 188 are configured to be folded over during the crimping process to mechanically and electrically connect to the conductor 170 of the wire 104. In an exemplary embodiment, the size and shape of the crimp barrel 184 may be determined by the vision system 200 for pre-check validation. For example, the length and/or the width and/or the height of the crimp tabs 188 may be determined by the vision system 200. The size of the cup 186 may be determined by the vision system 200. Relative positions of the wire 104 and the crimp barrel 184 may be determined by the vision system 200.

In various embodiments, the mating end 180 forms a socket configured to receive a blade terminal. For example, the socket may be rectangular shaped. In other various embodiments, the socket may be cylindrical shaped. In alternative embodiments, the mating end 180 may be a blade (for example, a planar generally rectangular structure) configured to be plugged into a mating terminal. In other various embodiments, the mating end 180 may be a pin, such as a cylindrical pin. In alternative embodiments, the mating end 180 may have other shapes and features. For example, the mating end 180 may include a post, such as a threaded post. Alternatively, the mating end 180 may include an opening, such as a threaded opening, configured to receive a bolt. Other types of mating ends may be used in alternative embodiments. In an exemplary embodiment, the size and/or the shape of the mating end 180 may be determined by the vision system 200 for validation pre-check.

Figure 3:
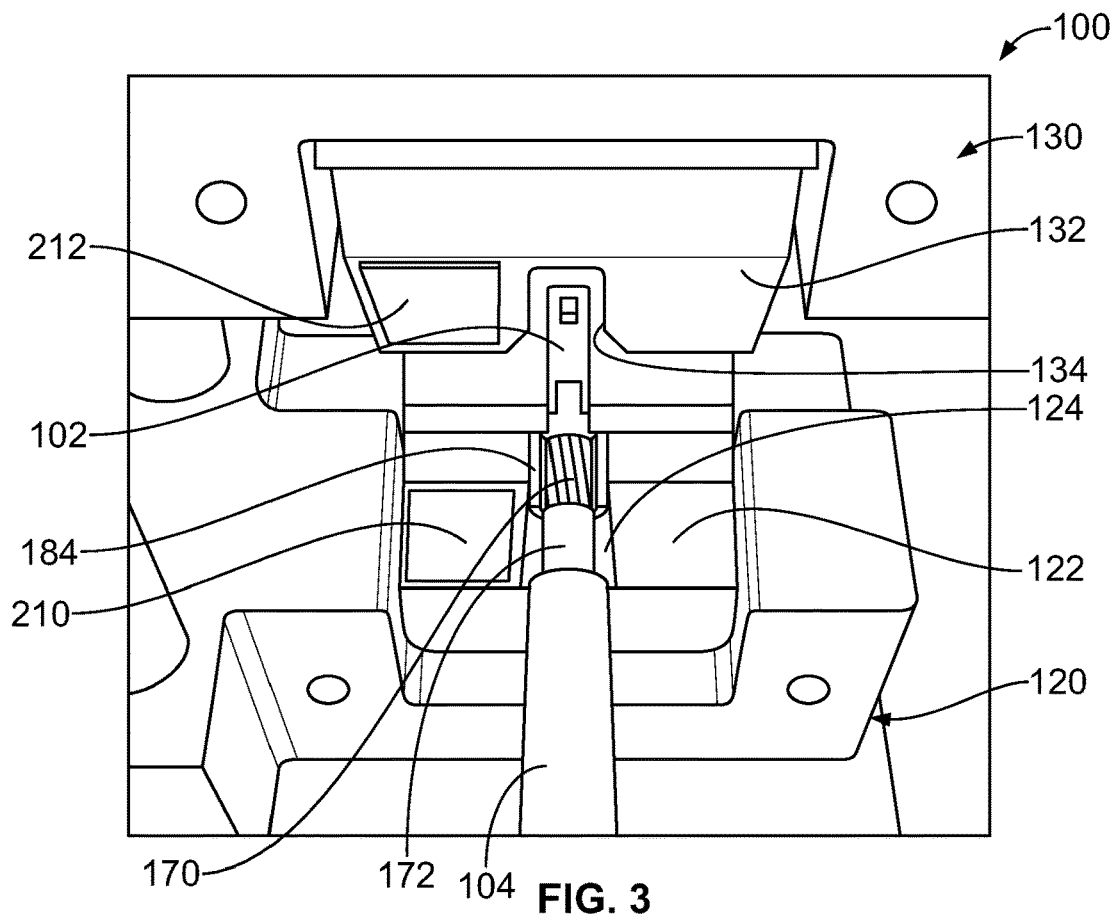
FIG. 3 is a front image of a portion of the crimp machine taken by the vision system in accordance with an exemplary embodiment.
Figure 4:
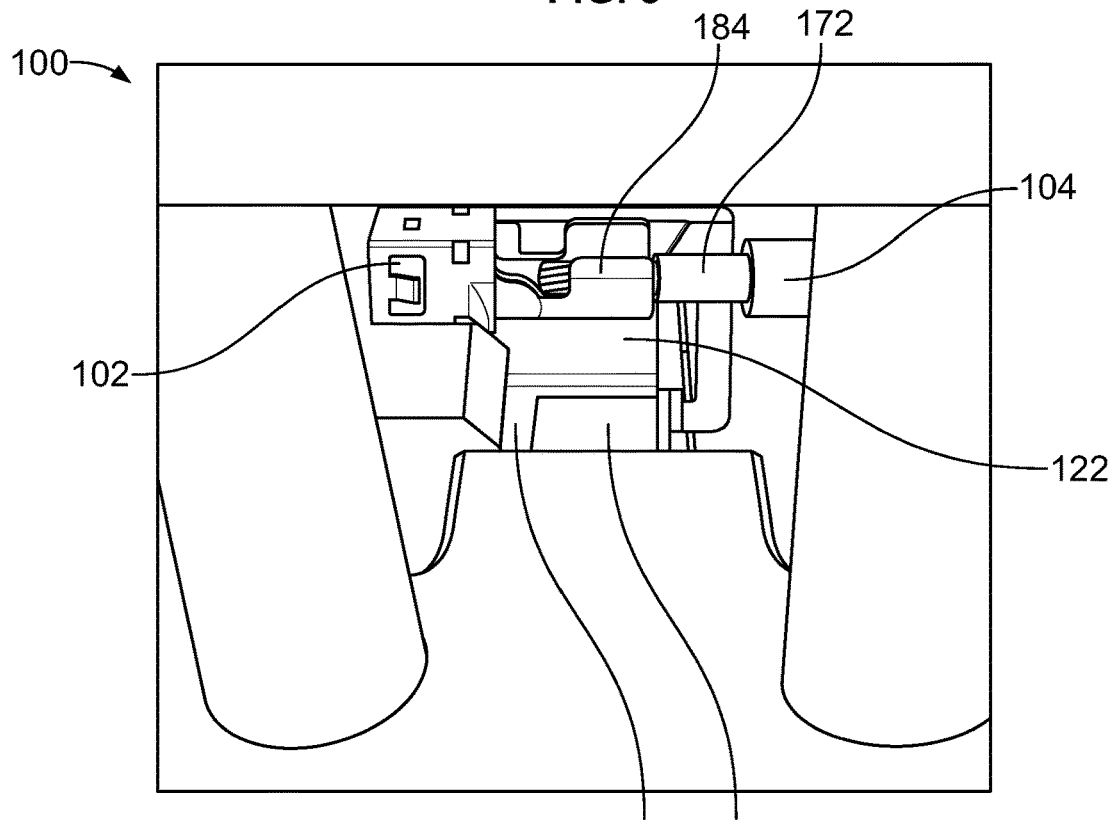
FIG. 4 is a left side image of a portion of the crimp machine taken by the vision system in accordance with an exemplary embodiment.
Figure 5:
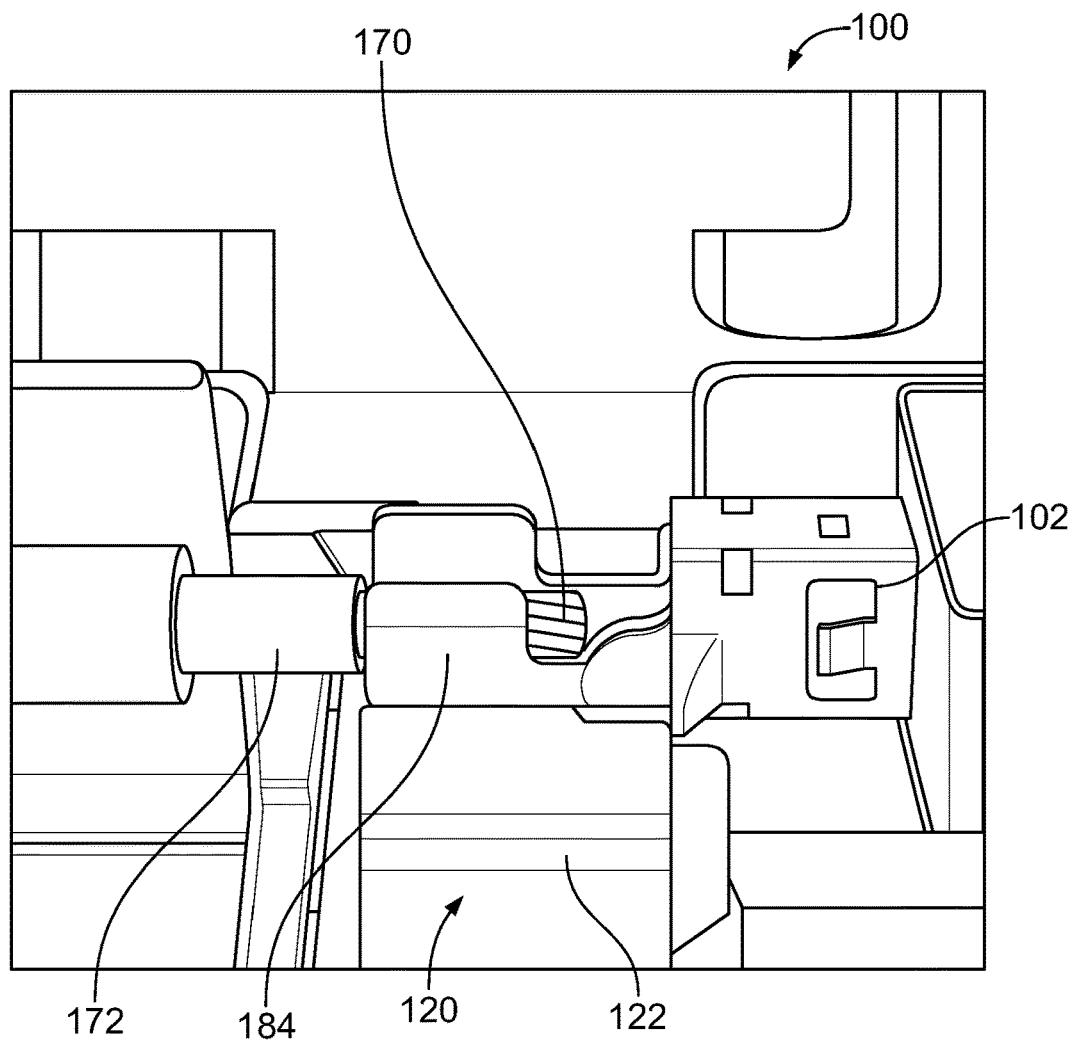
FIG. 5 is a right side image of a portion of the crimp machine taken by the vision system in accordance with an exemplary embodiment.

FIG. 3 is a front image of a portion of the crimp machine 100 taken by the vision system 200 in accordance with an exemplary embodiment. FIG. 4 is a left side image of a portion of the crimp machine 100 taken by the vision system 200 in accordance with an exemplary embodiment. FIG. 5 is a right side image of a portion of the crimp machine 100 taken by the vision system 200 in accordance with an exemplary embodiment. FIGS. 3-5 illustrate the terminal 102 and the wire 104 in the crimp zone 106. FIG. 3 illustrates the lower die 122 and the upper die 132. FIGS. 4 and 5 illustrate the lower die 122, but the upper die 132 is blocked from the view or outside of the view.

In an exemplary embodiment, the anvil 120 includes a lower die graphic identifier 210 and the press 130 includes an upper die graphic identifier 212. The lower die graphic identifier 210 is disposed on the lower die 122 and the upper die graphic identifier 212 is disposed on the upper die 132. In the illustrated embodiment, the lower die graphic identifier 210 is disposed on a top surface of the lower die 122. Other locations are possible in alternative embodiments. In the illustrated embodiment, the upper die graphic identifier 212 is disposed on a front surface of the upper die 132. Other locations are possible in alternative embodiments. Optionally, multiple lower graphic identifiers 210 and/or multiple upper graphic identifiers 212 may be provided. The multiple lower graphic identifiers 210 may be different from each other. The multiple upper graphic identifiers 212 may be different from each other. In an exemplary embodiment, the graphic identifiers 210, 212 are computer readable labels. For example, the graphic identifiers 210, 212 are scannable by the vision system 200. In an exemplary embodiment, the graphic identifiers 210, 212 are machine readable optical labels. For example, the graphic identifiers 210, 212 may be QR codes, barcodes, data matrix codes, or other types of optical labels. Other types of identifiers may be used in alternative embodiments, such as surfaces of the lower die 122 or the upper die 132, designs on the lower die 122 or the upper die 132 or other features capable of being identified by the vision system 200. In an exemplary embodiment, the graphic identifiers 210, 212 may be analyzed by the vision system 200 for validation pre-check. For example, the vision system 200 may determine that the correct lower die 122 and the correct upper die 132 are utilized within the machine to perform the crimp prior to performing the crimp operation.

During use, the terminal 102 and the wire 104 are loaded into the crimp zone 106 of the crimp machine 100. For example, the terminal 102 is placed on the anvil 120. The anvil 120 includes locating features for locating the terminal 102 relative to the lower die 122. For example, the locating features may be walls or surfaces that engage and position the terminal 102. In an exemplary embodiment, the terminal 102 is positioned such that the crimp barrel 184 is seated on the lower forming surface 124 of the lower die 122. The wire 104 is loaded in the crimp barrel 184. For example, the stripped end of the wire 104 is positioned such that the conductor 170 is received in the crimp barrel 184. Optionally, a portion of the insulator 172 may be positioned in the crimp barrel 184. Alternatively, no portion of the insulator 172 is located in the crimp barrel 184.

After the terminal 102 and the wire 104 are positioned in the crimp zone 106, the vision system 200 is operated to perform the validation pre-check. For example, the camera 202 is operated to image the crimp zone 106. In an exemplary embodiment, the terminal 102 and the wire 104 are visible within the image. In an exemplary embodiment, the lower die 122 and the upper die 132 are visible within the image. Optionally, multiple cameras 202 are provided at different locations relative to the crimp zone 106. The multiple cameras 202 image the crimp zone 106 from different angles. Images from the multiple cameras 202 are analyzed to perform the validation pre-check prior to performing the crimping operation. In various embodiments, the vision system 200 is manually activated. For example, a user may initiate the validation pre-check at the user interface 152 (shown in FIG. 1). In alternative embodiments, the vision system 200 may be automatically activated, such as operated periodically or continuously. When the vision system 200 is activated, the cameras 202 capture images of the crimp zone 106. The images taken by the cameras 202 may be in the visual spectrum, or may be in other spectrums, such as infrared images, X-ray images, and the like. The vision system 200 analyzes the images to confirm if one or more validation criteria are satisfied. If the validation criteria are satisfied, the validation pre-check is a passing validation pre-check and the crimping process is allowed to proceed. For example, the controller 150 (shown in FIG. 1) may signal the actuator 138 (shown in FIG. 1) to move the press 130 through the crimp stroke. If one or more the validation criteria are not satisfied, the validation pre-check is a failing validation pre-check and the crimping process is restricted. For example, the press 130 is unable to move through the crimp stroke to perform the crimping operation.

In various embodiments, the validation criteria for the validation pre-check includes checking that the proper lower die 122 is provided within the anvil 120. For example, different lower dies 122 may be used for termination of different terminals. The validation pre-check assures that the proper lower die 122 is provided for the particular terminal being terminated. In various embodiments, the validation criteria for the validation pre-check includes checking that the proper upper die 132 is provided within the press 130. For example, different upper dies 132 may be used for termination of different terminals. The validation pre-check assures that the proper upper die 132 is provided for the particular terminal being terminated. Optionally, the lower die 122 and the upper die 132 may be part of a matched set. The validation pre-check may determine that the lower die 122 and the upper die 132 are part of a matched set. In an exemplary embodiment, the vision system 200 checks the lower die 122 and the upper die 132 by scanning and analyzing the lower die graphic identifier 210 and the upper die graphic identifier 212.

In various embodiments, the validation criteria for the validation pre-check includes checking for proper orientation of the lower die 122 within the anvil 120. For example, the validation pre-check is used to determine that the lower die 122 is forward facing, such as facing the wire. In various embodiments, the validation criteria for the validation pre-check includes checking for proper orientation of the upper die 132 within the press 130. For example, the validation pre-check is used to determine that the upper die 132 is forward facing, such as facing the wire. In an exemplary embodiment, the vision system 200 checks the lower die 122 and the upper die 132 by scanning and analyzing the lower die graphic identifier 210 and the upper die graphic identifier 212.

In various embodiments, the validation criteria for the validation pre-check includes checking for proper positioning of the terminal 102 within the crimp zone 106. For example, the validation pre-check is used to determine that the terminal 102 is properly positioned relative to the lower die 122. The validation pre-check may be used to determine that the terminal 102 is properly positioned relative to the upper die 132. In various embodiments, the validation pre-check validates front to rear positioning of the terminal 102 within the crimp zone 106. In various embodiments, the validation pre-check validates side to side positioning of the terminal 102 within the crimp zone 106. In various embodiments, the validation pre-check validates vertical positioning of the terminal 102 within the crimp zone 106. For example, the validation pre-check may validate that the crimp barrel 184 of the terminal 102 is seated on the lower forming surface 124 of the lower die 122. In an exemplary embodiment, the vision system 200 performs validation pre-check by analyzing the image and performing pattern or boundary recognition to identify features of the terminal 102. For example, the vision system 200 may determine the location of the crimp barrel 184 by determining a front or edge of the terminal 102 and/or outer surfaces of the crimp barrel 184 and/or locations of the crimp tabs 188.

In various embodiments, the validation criteria for the validation pre-check includes checking for proper positioning of the wire 104 within the crimp zone 106. For example, the validation pre-check is used to determine that the wire 104 is properly positioned relative to the terminal 102. In various embodiments, the validation pre-check validates front to rear positioning of the wire 104 relative to the terminal 102. In various embodiments, the validation pre-check validates side to side positioning of the wire 104 relative to the terminal 102. In various embodiments, the validation pre-check validates vertical positioning of the wire 104 relative to the terminal 102. In various embodiments, the validation pre-check validates an angular position of the wire 104, such as relative to one or more axes and/or relative to the terminal 102. For example, the validation pre-check may determine that an angular deviation from one or more axes is within a tolerance. In an exemplary embodiment, the vision system 200 performs validation pre-check by analyzing the image and performing pattern or boundary recognition to identify features of the wire 104. For example, the vision system 200 may determine the location of an end 174 of the conductor 170 and/or an end 176 of the insulator 172. The vision system 200 may determine locations of the sides of the conductor 170 and/or the sides of the insulator 172. The vision system 200 may determine locations of other features of the wire 104, such as the outer shield and/or the outer jacket. In various embodiments, the vision system 200 may determine proper positioning of the wire 104 relative to the terminal 102 by comparing a wire center line with a crimp barrel center line. For example, offset of the wire center line relative to the crimp barrel center line beyond a threshold distance identifies in proper positioning of the wire 104 relative to the terminal 102 leading to failure of the validation pre-check.

In various embodiments, the validation pre-check is used to determine that the correct terminal 102 and the correct wire 104 are located within the crimp zone 106. The vision system 200 may determine the size and/or type of the terminal 102 based on the image. For example, the vision system 200 may determine a height and/or a width and/or a length of the terminal 102 or features of the terminal 102, such as the crimp barrel 184 to determine that the correct terminal 102 is located within the crimp zone 106. The vision system 200 may determine the size and/or type of the wire 104 based on the image. For example, the vision system 200 may determine a color of the insulator 172 to determine the type of wire 104. The vision system 200 may determine a diameter of the conductor 170 and/or a diameter of the insulator 172 to determine the type of wire 104.

In various embodiments, the validation pre-check is used to determine proper preparation of the wire 104 prior to performing the crimp. For example, the vision system 200 may determine a strip length of the insulator 172 to determine that a sufficient length of the conductor 170 is exposed beyond the insulator 172 for termination to the terminal 102. The strip length may be determined by identifying the end 174 of the conductor 170 and identifying the end 176 of the insulator 172.

In various embodiments, the validation pre-check determines proper positioning of the wire 104 relative to the terminal 102 by determining a length of the insulator 172 located within the crimp barrel 184. In various embodiments, any length of the insulator 172 within the crimp barrel 184 constitutes failure of the validation pre-check. In alternative embodiments, a certain length of the insulator 172 is designed to be located within the crimp barrel 184. Any length of the insulator 172 beyond the predetermined, allowable length constitutes failure of the validation pre-check.

In various embodiments, the validation pre-check determines proper positioning of the wire 104 relative to the terminal 102 by determining a length of the conductor 170 located beyond the crimp barrel 184. For example, the vision system 200 determines an amount of cable protrusion rearward of the crimp barrel 184. In various embodiments, any length of the conductor 170 protruding beyond the crimp barrel 184 constitutes failure of the validation pre-check. In alternative embodiments, a certain length of the conductor 170 is designed to protrude beyond the crimp barrel 184. Any length of the conductor 170 beyond the predetermined, allowable length constitutes failure of the validation pre-check. The vision system 200 may determine an amount of cable extending forward of the crimp barrel 184 to determine passing or failing of the validation pre-check.

In an exemplary embodiment, the system is configured to use just some of the validation prechecks or may be configured to use all of the validation prechecks. For example, the system can be set at the user interface 152 to enable or disable any permutation of validation pre-checks.

Figure 6:
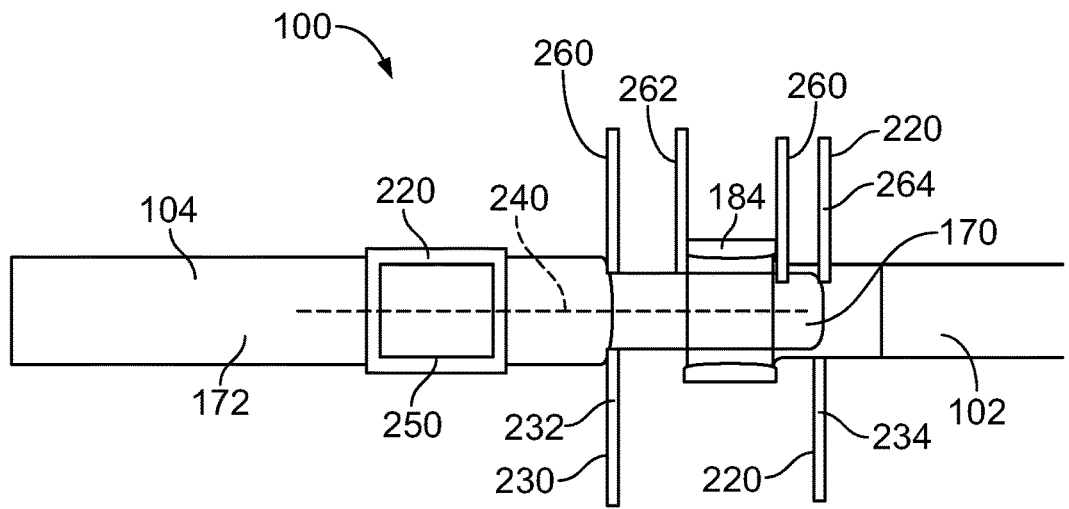
FIG. 6 is a top image of a portion of the crimp machine taken by the vision system in accordance with an exemplary embodiment.

FIG. 6 is a top image of a portion of the crimp machine 100 taken by the vision system 200 in accordance with an exemplary embodiment. FIG. 6 shows the terminal 102 and the wire 104 at the crimp zone 106. FIG. 6 shows the image displayed on the display 154 at the user interface 152 (shown in FIG. 1). In an exemplary embodiment, the vision system 200 is configured to overlay validation graphics 220 on the image shown on the display 154 for review by the user. The validation graphics 220 relate to validation criteria used by the vision system 200 for the validation pre-check. For example, the validation graphics 220 correspond with the validation criteria used by the image analysis module 204, which sets limits or ranges that are acceptable. The validation graphics 220 may be superimposed limit lines included on the user interface 152 that are configurable or adjustable by the user to impose a minimum tolerance and a maximum tolerance to be applied to the validation pre-checks. As such, the end user is able to calibrate or adjust the validation criteria to fit their requirements. The limit lines may be adjusted during or prior to run-time to tune or update the validation criteria. The criteria used for the validation pre-check is based on both the image and the overlaid validation graphics. The validation graphics 220 may be used during training of the neural network operated by the vision system 200, such as during factory calibration or set up. For example, the vision system 200 may overlay the validation graphics 220 on the image for training tolerance limits for the validation pre-check. The validation graphics 220 may be computer generated during the training of the neural network operated by the vision system 200. In an exemplary embodiment, the vision system 200 uses validation pre-check criteria for performing the validation pre-check. The validation pre-check criteria may be generated by a training process either using the crimp machine 100 or using another machine, such as at a manufacturing facility where pre-training and calibration of crimp machines is performed and then uploaded to the crimping machine 100.

The validation graphics 220 provide a visual representation of the validation criteria used by the vision system 200 for the validation pre-check. Various types of validation graphics 220 may be used by the vision system 200. For example, the validation graphics 220 may include lines (solid or dashed), boxes, dots, arrows, circles, triangles, other shapes, or other graphics. The validation graphics 220 may include digits, such as letters and/or numbers overlaid on the image. In an exemplary embodiment, the validation criteria may be customizable by the user. For example, the user may adjust, customize or define validation criteria usable by the vision system 200 for the validation pre-check. In various embodiments, the validation criteria is customized by the user by manually adjusting the location of the validation graphics 220 within the image to change the ranges or limits of the validation criteria. The strictness of the validation criteria may be increased or decreased by the user to more easily fail or pass the pre-checks. The validation criteria may be customizable during a calibration mode of operation of the vision system 200. Additionally or alternatively, the validation criteria may be customizable during normal operation of the vision system 200.

In various embodiments, the validation criteria includes an insulation strip range 230 relating to the strip length of the insulator 172, which corresponds to the exposed length of the conductor 170. The strip range 230 is identified by a forward line 232 and the rearward line 234. In alternative embodiments, the insulation strip range 230 may be defined by a box. The strip range 230 may be resizable by moving the forward line 232 and/or the rearward line 234. Optionally, the strip range 230 may be shown in a first color (for example, green) when the strip length satisfies the validation criteria and may be shown in a second color (for example, red) when the strip length fails the validation criteria.

In various embodiments, the validation criteria includes an angular limit line(s) 240 relating to the angle of the wire 104 relative to the terminal 102. For example, the wire 104 may be curved, kinked, bent, or otherwise laid within the crimp barrel 184 such that the wire centerline is angled relative to the terminal centerline. The angular limit lines 240 identify an acceptable angular limit for the wire 104 relative to the terminal 102. The angular limit lines 240 may be customizable, such as by rotating the angular limit lines 240 relative to the terminal centerline. Optionally, the angular limit lines 240 may be shown in a first color when the angle of the wire 104 satisfies the validation criteria and may be shown in a second color when the angle of the wire 104 fails the validation criteria.

In various embodiments, the validation criteria includes wire gauge lines 250 used to represent the wire gauge of the wire 104. The wire gauge lines 250 may form a box. The wire gauge lines 250 are used to determine that the proper wire 104 is provided at the crimp zone 106. The wire gauge lines 250 may be customizable. Optionally, the wire gauge lines 250 may be shown in a first color when the wire gauge of the wire 104 satisfies the validation criteria and may be shown in a second color when the wire gauge of the wire 104 fails the validation criteria.

In various embodiments, the validation criteria includes wire protrusion lines 260 used to represent the amount of protrusion of the conductor 170 from the crimp barrel 184 and/or the amount of protrusion of the insulator 172 into the crimp barrel 184. The wire protrusion lines 260 identify an acceptable range for the conductor protrusion and/or the insulator protrusion. In various embodiments, the wire protrusion lines 260 include forward wire protrusion lines 262 at the front of the crimp barrel 184 and rearward wire protrusion lines 264 at the rear of the crimp barrel 184. The forward wire protrusion lines 262 correlate to the position of the end 176 of the insulator 172 relative to the crimp barrel 184. The rearward wire protrusion lines 264 correlate to the position of the end 174 of the conductor 170 relative to the crimp barrel 184. The wire protrusion lines 260 may be customizable, such as by shifting the wire protrusion lines 260 forward or rearward. Optionally, the wire protrusion lines 260 may be shown in a first color when the amount of protrusion of the conductor 170 and/or the insulator 172 satisfies the validation criteria and may be shown in a second color when the amount of protrusion of the conductor 170 and/or the insulator 172 fails the validation criteria.

Figure 7:
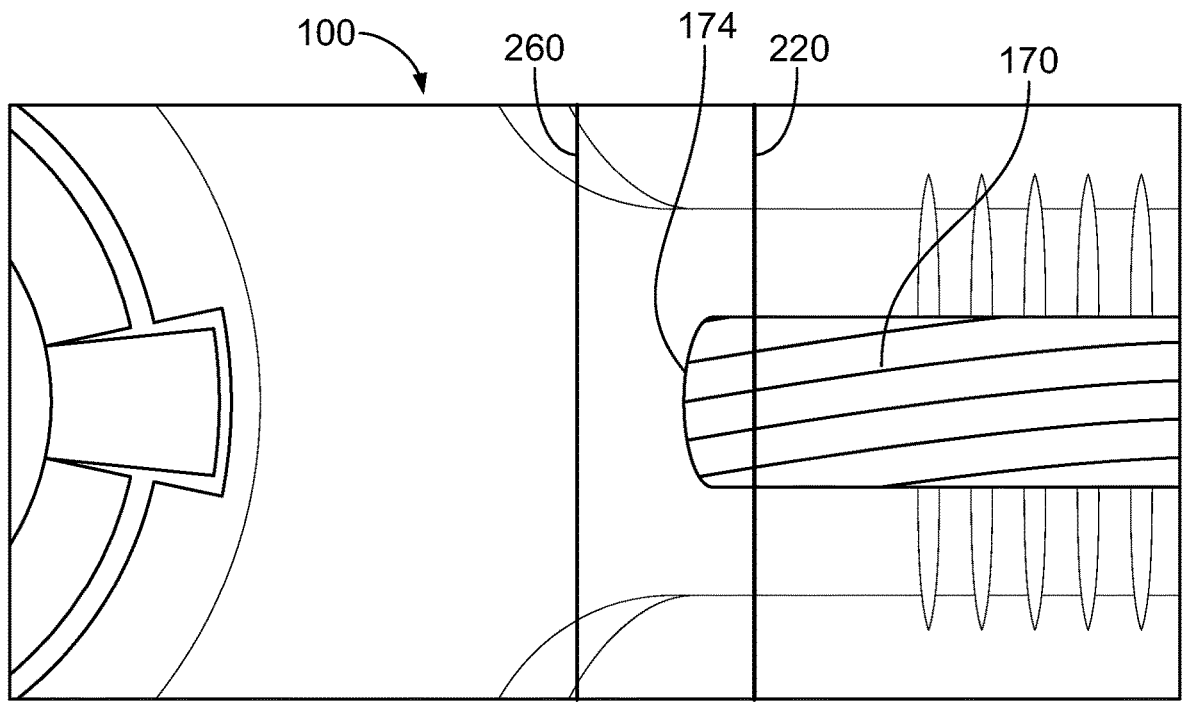
FIG. 7 is a top image of a portion of the crimp machine taken by the vision system in accordance with an exemplary embodiment.
Figure 8:
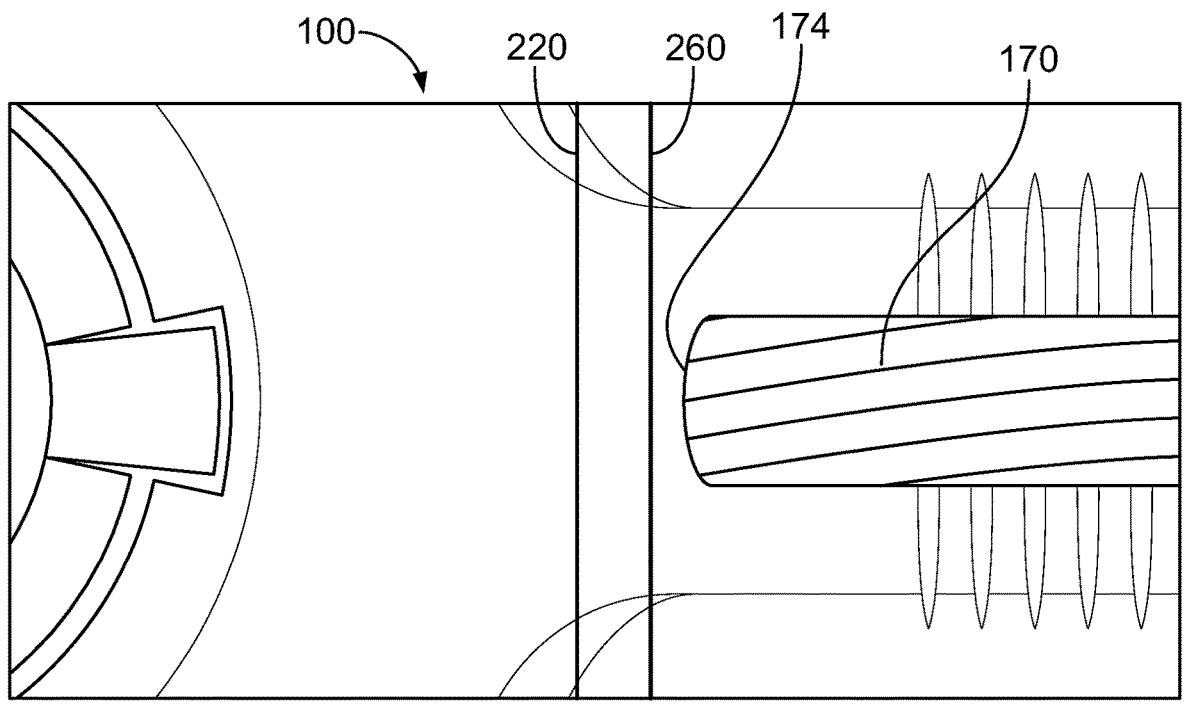
FIG. 8 is a top image of a portion of the crimp machine taken by the vision system in accordance with an exemplary embodiment.

FIG. 7 is a top image of a portion of the crimp machine 100 taken by the vision system 200 in accordance with an exemplary embodiment. FIG. 8 is a top image of a portion of the crimp machine 100 taken by the vision system 200 in accordance with an exemplary embodiment. FIGS. 7 and 8 illustrate the validation graphics 220 overlaid on the image. In the illustrated embodiment, the validation graphics 220 include the wire protrusion lines 260. Comparing the images shown in FIGS. 7 and 8, the wire protrusion lines 260 have been customized in FIG. 8 compared to FIG. 7. For example, the wire protrusion lines 260 have been shifted to narrow the acceptable range for the location of the end 174 of the conductor 170. The end 174 of the conductor 170 falls within the range of the wire protrusion lines 260 in FIG. 7, and thus would be classified as a passing validation pre-check. However, the end 174 of the conductor 170 falls outside of the range of the wire protrusion lines 260 in FIG. 8, and thus would be classified as a failing validation pre-check.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A crimp machine comprising:
an anvil having a lower die having a lower forming surface, the anvil configured to support a crimp barrel of a terminal that receives a wire;
a press having an upper die having an upper forming surface, the press being movable relative to the anvil during a crimping process to connect the crimp barrel to the wire, a crimp zone being defined between the upper forming surface and the lower forming surface;

a vision system positioned to view the crimp zone, the vision system including an imaging device configured to image the crimp barrel of the terminal and the wire, the vision system operating the imaging device to capture an image prior to the crimping process for performing a validation pre-check prior to the crimping process; and a controller operably coupled to the press, the controller configured to cause the press to move during the crimping process, the controller operating the press based on the validation pre-check performed by the vision system.

2. The crimp machine of claim 1, wherein the vision system processes the image to determine if the validation pre-check is a passing validation pre-check or if the validation pre-check is a failing validation pre-check.

3. The crimp machine of claim 1, wherein the controller causes the press to move through a crimp stroke to crimp the terminal to the wire based on the validation pre-check.

4. The crimp machine of claim 1, wherein the controller operates the press when the validation pre-check is a passing validation pre-check, the controller restricting operation of the press when the validation pre-check is a failing validation pre-check.

5. The crimp machine of claim 1, further comprising a cabinet, the anvil and the press being received in the cabinet, the vision system including a bracket, the imaging device being mounted to the bracket, the bracket being coupled to the cabinet.

6. The crimp machine of claim 1, wherein the anvil includes a lower die graphic identifier that is computer readable and disposed on the lower die, the press including an upper die graphic identifier that is computer readable and disposed on the upper die, the imaging device being configured to image at least one of the lower die graphic identifier or the upper die graphic identifier, the vision system reading the at least one of the lower die graphic identifier or the upper die graphic identifier in the image for performing the validation pre-check.

7. The crimp machine of claim 6, wherein the lower die graphic identifier is a scannable barcode and the upper die graphic identifier is a scannable barcode.

8. The crimp machine of claim 1, further comprising a user interface communicatively coupled to the vision system, the user interface including a display, the image being shown on the display for review by a user.

9. The crimp machine of claim 8, wherein the display overlays validation graphics on the image for review by the user, the validation graphics relating to validation criteria used by the vision system for the validation pre-check.

10. The crimp machine of claim 9, wherein the overlaid validation graphics are customizable by the user to adjust the validation criteria used by the vision system during the validation pre-check.

11. The crimp machine of claim 8, wherein the user interface includes superimposed limit lines adjustable by a user to impose a minimum tolerance and a maximum tolerance to be applied to the validation pre-checks.

12. The crimp machine of claim 1, further comprising a display, the image being shown on the display, the vision system configured to overlay validation graphics on the image for defining tolerance limits for the validation pre-check.

13. The crimp machine of claim 1, wherein the vision system uses validation pre-check criteria for performing the validation pre-check, the validation pre-check criteria is generated by a training process.

14. The crimp machine of claim 1, wherein the imaging device images the upper die and the lower die, the validation pre-check comprising determining relative positions of the upper die and the lower die.

15. The crimp machine of claim 1, wherein the imaging device images the terminal and the lower die, the validation pre-check comprising determining relative positions of the terminal and the lower die.

16. The crimp machine of claim 1, wherein the imaging device images the wire and the terminal, the validation pre-check comprising determining relative positions of the wire and the terminal.

17. The crimp machine of claim 16, wherein the validation pre-check comprises determining if insulation of the wire is in the crimp barrel of the terminal.

18. The crimp machine of claim 16, wherein the validation pre-check comprises determining if a conductor of the wire protrudes from the crimp barrel.

19. The crimp machine of claim 1, wherein the imaging device images the wire, the validation pre-check comprises determining a wire diameter of the wire.

20. The crimp machine of claim 1, wherein the imaging device images the wire, the validation pre-check comprises determining a strip length of an insulator of the wire.

21. The crimp machine of claim 1, wherein the imaging device images the wire, the validation pre-check comprises determining an insulation color of the wire.

22. The crimp machine of claim 1, wherein the imaging device images the wire, the validation pre-check comprises determining an angular position of the wire.

23. The crimp machine of claim 1, wherein the vision system includes an artificial intelligence (AI) module providing input to the vision system for performing the validation pre-check, the AI module being updated based on the image.

24. A crimp machine comprising:
an anvil having a lower die having a lower forming surface, the anvil including a lower die graphic identifier that is computer-readable and disposed on the lower die, the anvil configured to support a crimp barrel of a terminal that receives a wire;
a press having an upper die having an upper forming surface, the press including an upper die graphic identifier that is computer-readable and disposed on the upper die, the press being movable relative to the anvil during a crimping process to connect the crimp barrel to the wire, a crimp zone being defined between the upper forming surface and the lower forming surface;
a vision system positioned to view the crimp zone, the vision system including an imaging device configured to image at least one of the lower die graphic identifier or the upper die graphic identifier, the vision system operating the imaging device to capture an image prior to the crimping process, the vision system reading the at least one of the lower die graphic identifier or the upper die graphic identifier in the image for performing a validation pre-check prior to the crimping process; and
a controller operably coupled to the press, the controller configured to cause the press to move during the crimping process, the controller operating the press based on the validation pre-check performed by the vision system.

25. A method of performing a crimping process on a crimp machine, the method comprising:
positioning an anvil having a lower die having a lower forming surface at a crimp zone of the crimp machine, the anvil configured to support a crimp barrel of a terminal that receives a wire;

positioning a press having an upper die having an upper forming surface at the crimp zone of the crimp machine, the press being movable relative to the anvil during the crimping process to connect the crimp barrel to the wire;

positioning an imaging device of a vision system proximate to the crimp zone of the crimp machine to image the crimp barrel of the terminal and the wire to capture an image for performing the validation pre-check prior to the crimping process; and operating the press to cause the press to move through a crimp stroke based on the validation pre-check performed by the vision system.

26. The method of claim 25, wherein the vision system restricts operation of the crimping process and movement of the press until the validation pre-check is performed and the validation pre-check is a passing validation pre-check.

\* \* \* \* \*